J. H. PATTERSON.
CASH REGISTER.
APPLICATION FILED NOV. 7, 1910.

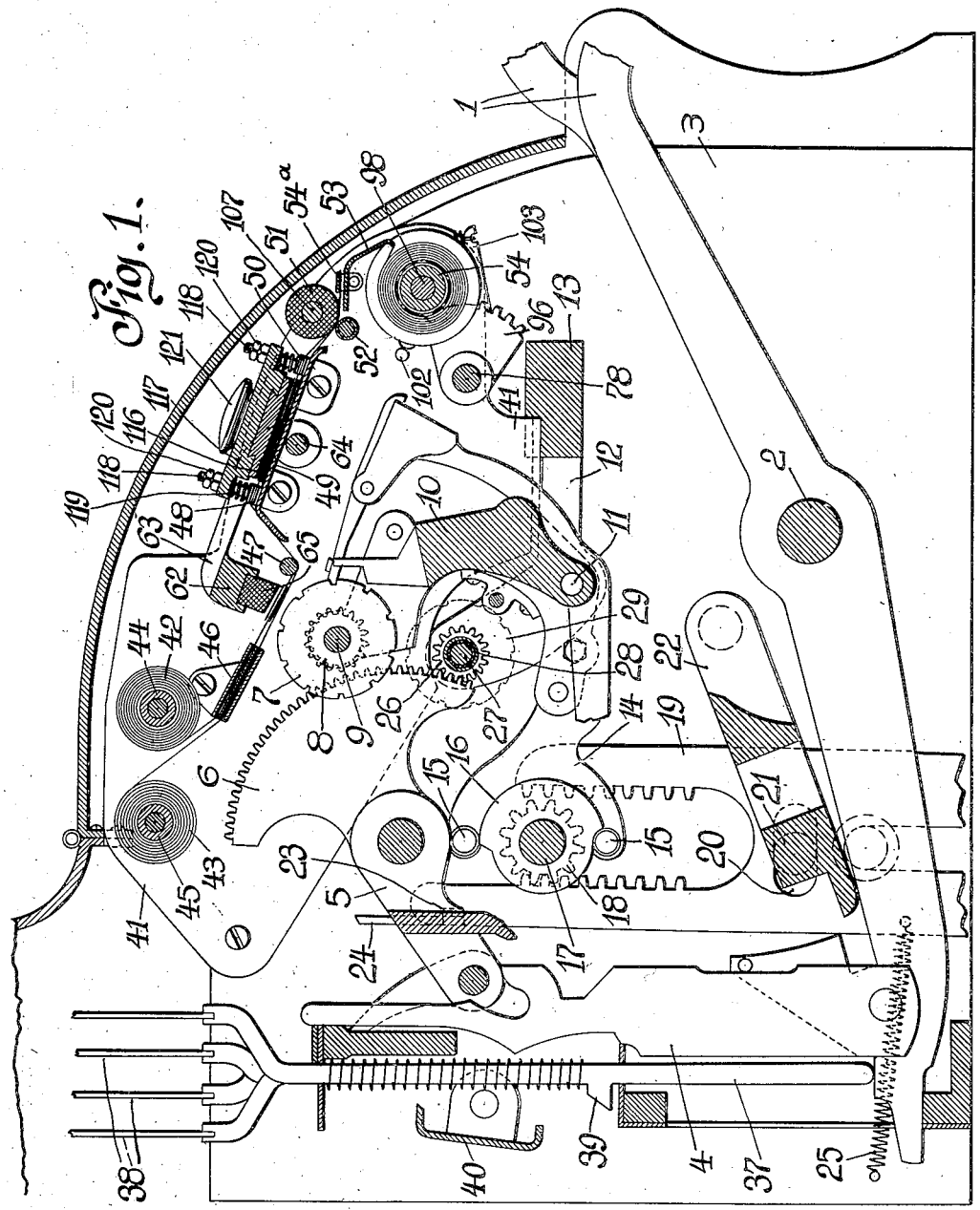

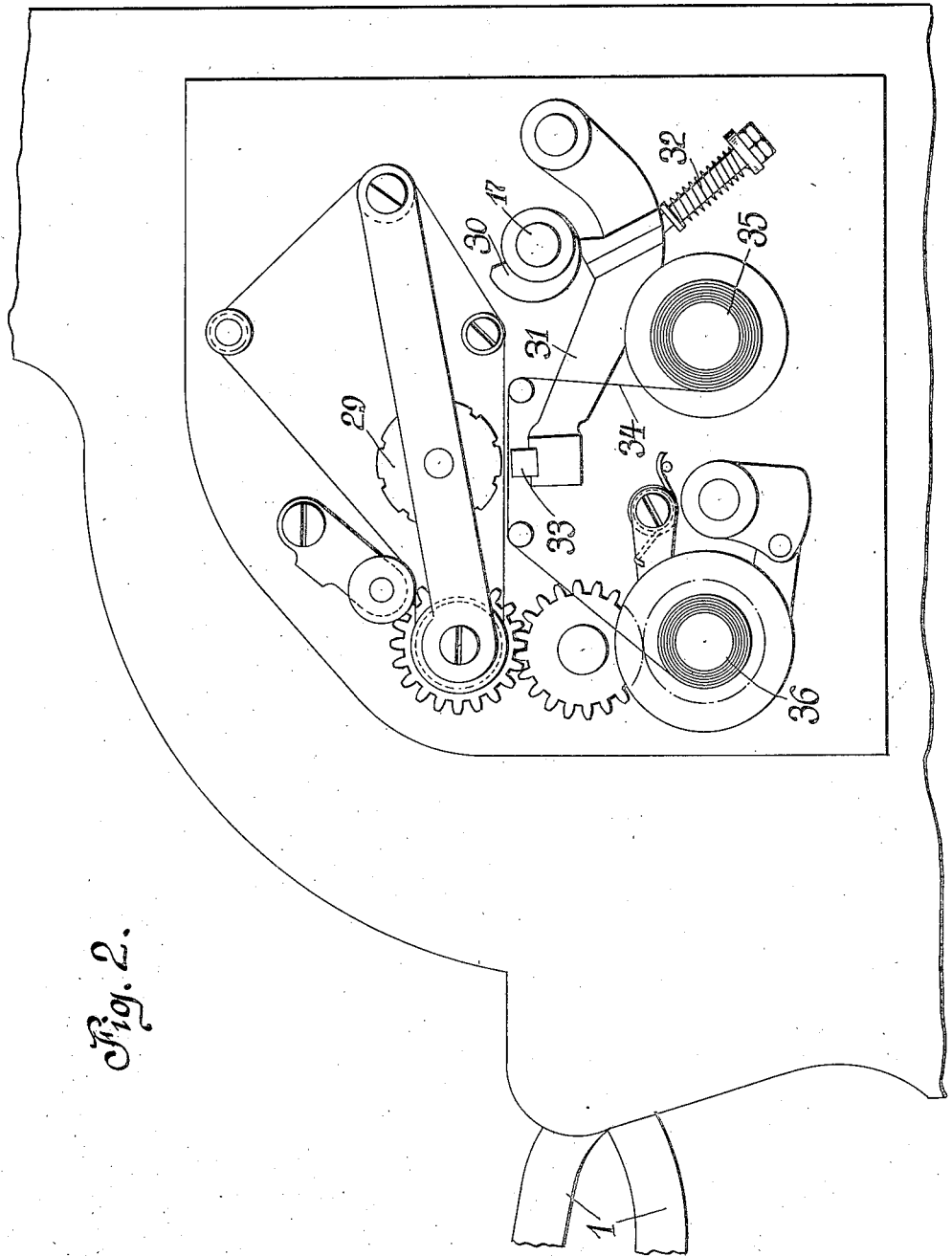

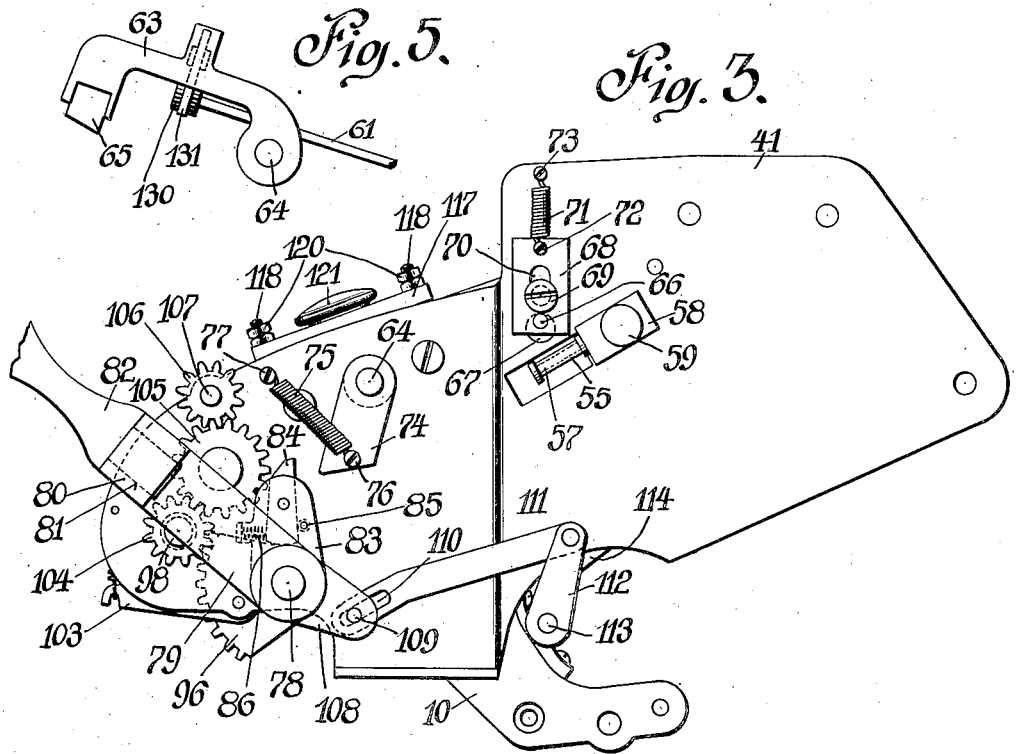

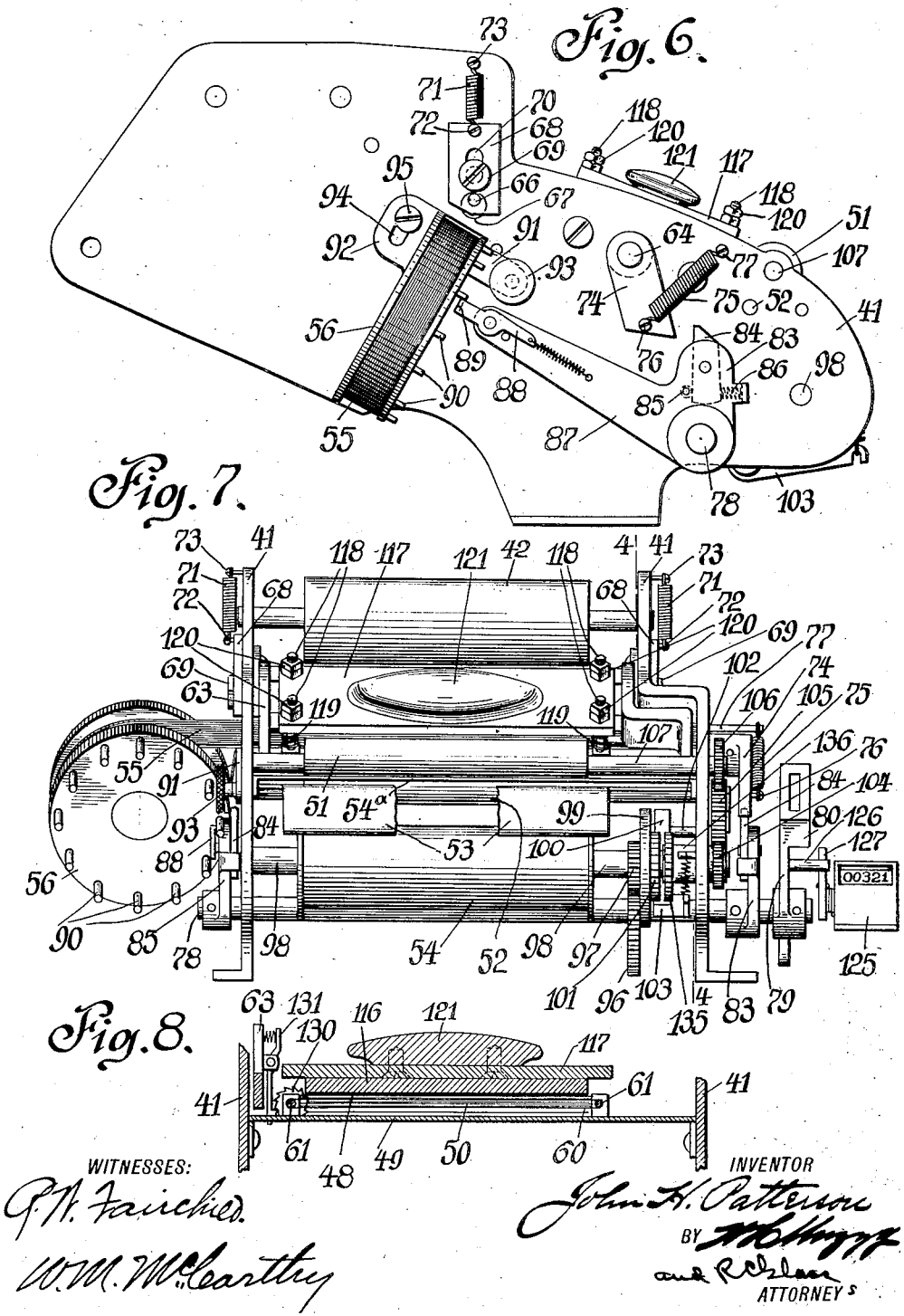

1,150,958.

Patented Aug. 24, 1915.
5 SHEETS—SHEET 5.

Fig. 9.

42

| 4 | 2 7 2 | 7 5 |

I CERTIFY THE ABOVE TO BE CORRECT:

SIG. *John Doe*   DATE 7.5.10.

TOTALIZING COUNTER No. 321

✓ A M.
P M.

MAIN STR. BRANCH.   REG. No. 722785

Witnesses

Inventor

UNITED STATES PATENT OFFICE.

JOHN HENRY PATTERSON, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,150,958.   Specification of Letters Patent.   Patented Aug. 24, 1915.

Application filed November 7, 1910. Serial No. 591,049.

*To all whom it may concern:*

Be it known that I, JOHN H. PATTERSON, a citizen of the United States, residing at Dayton, in the county of Montgomery and State of Ohio, have invented certain new and useful Improvements in Cash-Registers, of which I declare the following to be a full, clear, and exact description.

This invention relates to accounting machines and more particularly to the recording mechanism of the same.

Many of the large corporations of the industrial world comprise numerous retail establishments located throughout the various cities and States of the Union and in order that the proper supervision of said establishments may be had it is necessary to provide a large and expensive auditing force, the employees of which make frequent visits to the various establishments to check up the same.

It is the principal object of this invention to provide a system whereby the local managers of the various retail establishments may at the end of the day's business forward a detailed statement of the various transactions as they occur in each establishment and also a statement of the total of the transactions that go to make up the daily or itemized statement, thereby doing away with the expensive auditing force heretofore required.

For the sake of illustration the improvements have been shown as applied to the type of machine shown and described in Patents No. 497,860 and 683,877 granted to Thomas Carney, May 23, 1893, and October 1st, 1901, respectively, but it is to be understood that this invention is not to be limited to this particular type of machine but with equal facility may be applied to other types of machines.

With this and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 represents a central transverse section through a machine of the type shown in the Carney patents above mentioned with the improvements applied thereto. Fig. 2 is a side elevation showing the item recording mechanism. Fig. 3 is a side elevation of the total recording mechanism. Fig. 4 is a transverse section taken approximately on line 4—4 of Fig. 7. Fig. 5 is a detail side elevation of the total printing platen and pawl carried thereby for feeding one of the inking ribbons. Fig. 6 is an end elevation of the total printing and recording mechanism looking from the opposite side of that shown in Fig. 3. Fig. 7 is a front elevation of the total printing mechanism. Fig. 8 is a longitudinal section through the impression mechanism for recording suitable data upon the total printing slip. Fig. 9 is a plan view of a portion of the total record strip.

For the purpose of a better understanding of the description to follow it may be stated in general terms that the machine embodying the invention comprises a series of operating keys of different value which when depressed actuate registering segments differentially. These keys previous to the actuation of the segments rock a plurality of total type carriers carried in a pivoted frame into engagement with the actuating segments so that the movement imparted to said segments will be conveyed to the total type carriers, these type carriers being rocked out of engagement with the segments previous to the return movement of the latter so that said type carriers will be left in their adjusted position. These segments also are connected to item type carriers from which an impression is taken upon an item record strip while said carriers are in their adjusted position after which the segments and type carriers are returned to their normal positions.

At the end of the day's business the local manager opens the cabinet of the machine and manipulates a lever by which movement a platen is forced against the total type carriers to take an impression upon two total record strips, after which the strips are fed to have certain information written thereupon by the manager and thereafter a portion of one of the strips is detached, while the other strip is fed on a storage roller within the machine.

As each item is recorded upon the item strip it is also displayed by suitable indicating mechanism to the customers in the establishment.

The operating mechanism comprises a series of keys 1 which are divided into banks and are mounted upon a transverse rod 2, the latter being suitably supported by the side frames 3 of the machine. At their rear ends the keys 1 carry graduated uprights 4 which rock frames 5 differentially when said keys are depressed. Secured to these frames 5 are segments 6 which are constructed to rotate type wheels 7 by engaging pinions 8 secured to said type wheels. These type wheels are supported by a shaft 9 mounted in a frame 10 which is pivoted as at 11 to rearward extensions 12 of a tie bar 13, the latter being suitably supported by the side frames 3. The frame 10 is provided with a rearwardly extending arm 14 which is forked at its rear end, each of the forked members of said arm being provided with an anti-friction roller 15 which engages with a cam 16 secured to the rotary shaft 17. This shaft has secured thereto a pinion 18 which normally engages with the rear part of a two-faced rack plate 19. This rack plate 19 is equipped with an elongated slot 20 in which plays a stud 21 projecting from a universal bar or key coupler 22 pivotally mounted to the side frames of the machine. Upon depressing the forward ends of the keys 1 the coupler 22 will be elevated immediately and through the stud 21 raise the rack 19 which in turn will cause the shaft 17 to rotate. The shape of the cam 16 secured to the shaft 17 is such that upon the beginning of the rotation of the shaft the arm 14 and consequently the frame 10 will be rocked to carry the pinions 8 of the type carriers 7 into engagement with the actuating segments 6. The continued downward movement of the forward ends of the keys 1 will, by the graduated uprights 4, rock the frames 5 and the segments 6 and by the latter impart a differential movement to the type carrier 7. At the end of the down stroke of said keys the rearward portion of the rack plate, which during the downward movement of the keys is held in engagement with the pinion 18 by a stud 23 projecting from the upper end of said rack plate which engages with the forward side of a lug 24 projecting from one of the side frames 3, will be withdrawn from engagement of said pinion and the forward portion of said plate 19 will be drawn into engagement with the pinion by a coil spring 25. As the keys 1 start upon their return movement the forward edge of said plate will continue the rotation of the shaft 17 and this continued rotation of the shaft will by the cam 16 rock the frame 10 carrying the type carriers 7 out of engagement with the segments 6 so that the said segments may return to normal position with the keys 1. From this it will be seen that the total represented by the successive operation of the keys 1 will be accumulated upon the type carriers 7.

The segments 6 are continuously in engagement with pinions 26 secured to the inner ends of a shaft 27 and to nested sleeves 28 surrounding said shaft. The outer end of the shaft 27 and sleeves 28 carry type carriers 29 (see Fig. 2). The outer end of the rotary shaft 17 as shown in Fig. 2 is provided with a cam 30, which as the shaft 17 is rotated by the downward movement of the keys 1, will rock a platen arm 31 counter clockwise, as viewed from Fig. 2, against the tension of a coil spring 32. The shape of the cam 30 secured to the rotation shaft 17 is such that just at the end of the down stroke of the operating keys the said cam will pass out of engagement with the platen arm 31, allowing the latter to spring upwardly thereby forcing the platen 33 carried by the free end of the arm 31 into contact with type carriers 29 so as to record upon a record strip 34 the items as they are entered in the machine. This item record strip is fed from a supply roll 35 to a storage roller 36 by suitable mechanism well known in the art and which need not be described here.

The extreme rear ends of the keys 1 support standards 37 which carry at their upper ends indicators 38 for indicating through suitable openings (not shown) the items as they are entered in the machine. These indicator standards 37 are provided with lugs 39 which engage with the upper side of a frame 40 pivoted to the side frames 3 and are thereby held in position to display the item between the entering of said items in the machine.

The description so far given is of a type of machine well known in the art and fully shown and described in the patents previously mentioned with the exception that the digit carriers 7 are here shown as type carriers instead of registering wheels, and for any further description reference may be had to said patents.

Upon the rearward extension 12 of the tie bar 13 are mounted plates 41 which form a supporting frame for the total record strips and coöperating mechanism. These record strips 42 and 43 are mounted respectively upon storage rollers 44 and 45 which are supported by the plates 41. These strips 42 and 43 are led from the storage rollers 44 and 45 through a guide plate 46 suitably mounted within the plates 41, around a guide pin 47, and thence through a guide plate 48 over a table 49 forming part of an impression mechanism, and through a guide plate 50, from whence they are led through feed rollers 51 and 52 over a table 53, the strip 43 being then wound on a storage roller 54 suitably mounted within the plates 41 while the strip 42 is free to be drawn across the edge of a serrated plate 54ᵃ mounted above the table 53, so that a portion of the latter strip may be detached from the rest of said strip.

An endless inking ribbon 55 is led around a spool 56 (see Figs. 6 and 7) through suitable openings in the plates 41 and around a guide roller 57 projecting from a plate 58 secured to the right hand plate 41 by a set screw 59 (see Fig. 3). One of the strands of ribbon 55 passes above the strip 42 while the other strand of said ribbon passes between the strips 42 and 43 (see Fig. 1). Above the table 49 the strips 42 and 43 have passing thereover strands of an endless ribbon 60 (see Figs. 1 and 8), the said ribbon passing around pins 61 supported by the guide plates 48 and 50.

A yoke shaped frame 62, the side arms 63 of which are secured to a rock shaft 64 suitably mounted in the plates 41, carries a platen 65 which normally lies directly above the strands of the inking ribbon 55. The frame 62 carrying the platen 65 is normally held slightly elevated above the ribbon 55 by pins 66 which project through openings 67 formed in the plates 41. These pins are mounted upon plates 68 which are guided on the side plates 41 by screws 69 which play through elongated slots 70 formed in the plates 68. The lower ends of the slots 70 are held in contact with the screws 69 by springs 71, the ends of which are secured to screws 72 and 73 projecting respectively from the plates 68 and 41 (see Figs. 3 and 6). By this construction the pins 66 of the plates 68 support the platen frame 62 in its slightly elevated position as shown in Fig. 4. The ends of the rock shaft 64 to which the side arms 63 of the platen frames 62 are secured project through side plates 41 and have secured thereto downwardly extending arms 74 which are normally held in the position shown in Figs. 3 and 6 by coiled springs 75, the ends of which are secured to screws 76 and 77 projecting respectively from the arms 74 and the side plates 41.

A rock shaft 78 is supported by the side plates 41 and upon its right hand end, which extends through one of the side plates 41, is secured a forwardly extending arm 79 (see Figs. 3 and 7), the upper end of which is provided with an enlarged head 80 equipped with a recess 81 into which the reduced portion of a detachable handle 82 is arranged to be inserted. Between the arm 79 and the right hand side plate 41 is an upwardly extending arm 83 fastened to the shaft 78 carrying a wiper pawl 84. This pawl is centrally pivoted upon the arm 83 and its lower end is held in contact with a stud 85 projecting from the arm 83 by a spring 86. When the shaft 78 is rocked clockwise (see Fig. 3) by the handle 82, the upper end of the pawl 84 will engage with the lower forward edge of the arm 74 secured to the shaft 64 and thereby rock said shaft counter clockwise, which movement will elevate the rearward end of the frame 62 carrying the platen 65 against the tension of the springs 75. Near the end of the operative movement of the handle 82 the pawl 84 will pass out of engagement with the arm 74 allowing the spring 75 forcibly to carry the platen 65 into contact with the total type carriers 7 to take an impression therefrom upon the record strips 42 and 43. In its downward movement the platen frame 62 will contact with the pins 66 and force the springs 71 to yield sufficiently to permit the striking of the total type carriers by the platen 65 after which the springs 71 will return the platen to the position shown in Fig. 4. On the left hand end of the shaft 78 (see Fig. 6) is an arm somewhat similar to the arm 83 carrying the wiper pawl 84, which acts upon the left hand arm 74 in a manner similar to the pawl 84 carried by the arm 83 secured near the right hand end of the shaft 78. The left hand arm 83 has a rearward extension 87 which carries a wiper pawl 88 at its extreme rear end. This pawl has an offset 89 which engages with one of a series of pins 90 projecting from one of the side plates of the spool 56 around which the ribbon 55 is wound and imparts a slight rotary movement to said spool 56, thereby feeding the ribbon 55 as the rearward end of the arm 83 is lowered. A guide plate 91 for the ribbon 55 is pivoted to the left hand side plate 41 by a set screw 93 and one of the side plates of the ribbon spool 56 has an offset 92 provided with an elongated slot 94 through which a set screw 95 projects. By this arrangement the spool 56 and the ribbon 55 may be independently adjusted properly to position the ribbon relative to the record strips 42 and 43. The left hand pin 61, as viewed in Fig. 8, around which the ribbon 60 passes is provided with a ratchet wheel 130 with which a spring controlled pawl 131 mounted upon the left hand arm 63 of the platen frame 62 engages as said platen frame is elevated and thereby rotates said ratchet which movement feeds the ribbon 60.

Secured to the shaft 78 on the inside of the right hand side frame 41 (see Figs. 3 and 7) is a segmental rack plate 96 which meshes with a pinion 97 loosely mounted upon a shaft 98 to which is secured the storage roller 54 for the total record strip 43. This pinion has attached thereto a disk 99 which carries a spring pressed feed pawl 100 (see Fig. 4). Upon the movement of shaft 78 in the direction to operate the platen frame 62 by the handle 82, the segment 96 will idly rotate the pinion 97 and the disk 99 in a counter clockwise direction. As the handle 82 is returned to normal position the pawl 100 carried by the disk 99 will engage with a tooth of a ratchet wheel 101 secured to the shaft 98 and rotate said shaft in a clockwise direction to wind the total record strip 43 upon the storage roll 54. When the handle 82 reaches normal position, the pawl 100 mounted upon the disk 99 will be rocked out of engagement with the ratchet 101 by a pin 102 projecting inwardly from the right hand side plate 41. The purpose of this disengagement of the pawl 100 from the ratchet wheel 101 is to enable the unwinding of the strip 43 from the storage roller 54 which is accomplished by first depressing a retaining pawl 103 from engagement with the ratchet 101 and rotating the storage roller 54 in the direction opposite from that in which it is normally fed.

Adjacent to the ratchet 101 is a similar ratchet 135 (see Fig. 7) which is secured to one end of a short sleeve 136, the latter being loosely mounted upon the shaft 98. The other end of this sleeve 136 carries a pinion 104 which meshes with an idler 105 mounted upon the right hand side plate 41 the idler in turn engaging with a pinion 106 secured to the shaft 107 carrying the previously described feed roller 51. The pawl 100 is of sufficient width to act upon both of the ratchets 101 and 135 which is also true of the retaining pawl 103. From this it will be seen that while the strip 43 is being fed upon the storage roller 54 the strip 42 will be fed into position to be grasped by the operator and drawn across the serrated plate 54ᵃ so as to detach the exposed portion of the strip 42 from the rest of said strip.

In order properly to aline the total type carriers 7 when a record is being made therefrom, the arm 79 to which the handle 82 is attached has a downwardly extending portion 108 which is provided with a laterally extending pin 109 that plays in an elongated slot 110 of the forward end of a link 111, the rear end of said link being attached to the upper end of an arm 112 secured to a rock shaft 113 suitably mounted upon the frame 10 carrying the total type carriers 7. Just previous to the escapement of the platen frame 62 the pin 109 will engage with the forward end of a slot 110 and thereby move the link 111 forwardly which movement will rock the shaft 113 through means of the arm 112. This rocking of the shaft 113 will elevate the rearward ends of pawls 114 which will engage the spring fingers 115 and force the V shaped ends of said spring fingers into notches formed by the separation of the type upon the total type carriers 7 and thereby aline said type carriers, directly after which operation the platen frame 62 will be released to take an impression from said type carriers.

From the previous description it will be recalled that the strips 42 and 43 are fed by the return movement of the handle 82 which is after the total has been recorded upon said strips. This feeding of the strips 42 and 43 is sufficient to bring the recorded total along the rearward edge of an electroplate 116 carried by the hammer 117 which is mounted upon studs 118 projecting upwardly from the guide plates 48 and 50. Springs 119 surround the studs 118 and are interposed between the under sides of the hammer 117 and the guide plates 48 and 50 so as to hold the said hammer and the electroplate 116 carried thereby elevated above the strips 42 and 43 and the inking ribbon 60. Suitable adjusting screws 120 are secured to the extreme upper end of studs 118 to regulate the stroke of the hammer 117. This hammer 117 is provided with a knob 121 which is arranged to be struck by the operator to force the hammer downwardly in order that an impression may be made upon the record strips from the electroplate 116. This electroplate is provided with division lines, as shown in Fig. 9, so as properly to divide the total which is previously recorded upon the strips 42 and 43 by the platen 65 and also other suitable data as shown in said figure. After an impression has been taken upon the record strips 42 and 43 by depressing the hammer 117, the shaft 78 is rocked several times by the handle 82 to feed the record strip, through the segment 96 and pinion 97, as heretofore described, so as to bring the said strips into position upon the table 53 to enable the manager to fill out the blank spaces on the strips, Fig. 9, left by the impression mechanism, after which the exposed portion of the strip 42 is detached from the rest of the strip, as previously described. In the feeding of the record strips, as just described, the shaft 78 is not rocked far enough to cause the wipe pawls 84 carried by the arms 83 secured to the shaft to actuate the arms 74 projecting from the shaft 64, which has secured thereto the frame carrying the total printing platen 65. The detached portion of the strip is then sent to the home office by the local manager with the strip 34 bearing the items that go to make up the total shown by the total record strip. Upon the back of this item strip 34 is written the same information that is inserted in the blank spaces of the total strip so that the corresponding strips may be identified.

The number shown opposite the "totalizing counter No." in Fig. 9 is obtained from the counter 125 shown in Fig. 7 of the drawings. This counter is an ordinary cyclometer of the Veeder make and is actuated by a pin 126 which projects from the arm 79. This pin contacting with a spring operated arm 127 which operates the units wheel of the counter 125. The relative location of the pin 125 carried by the arm 79 and the arm 127 of the counter 125 is such that the said arm 127 will not be actuated only upon a complete stroke of the operating handle 82.

By this invention it will be seen that the home office may be furnished daily with an itemized statement of each transaction as it occurs in the store and also the total of said transactions, thereby providing a system as complete as if the various local establishments were under the personal supervision of the home office.

The total record strip 43 which is stored within the machine is to provide the local manager with a counter check upon the statements forwarded to him by the home office and also for the extra purpose of providing an additional safeguard in case the strips forwarded by him to the home office become lost in transit.

While the form of mechanism shown herewith and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a machine of the class described, the combination with two sets of type carriers, of a single set of actuators therefor, operative relation between one set of the type carriers and the actuators being normally established and between the other set of type carriers and the actuators being normally disestablished, keys and connections for establishing operative relation between the actuators and the last mentioned set of type carriers and then differentially positioning both sets of type carriers, and means for taking an impression upon a record strip from the set of type carriers normally out of operative relation with the actuators and for feeding the record strip.

2. In a machine of the class described, the combination with a set of differentially movable actuators, operating keys therefor, a set of type carriers continuously connected to said actuators for listing items upon a record strip, a second set of type carriers normally disconnected from the actuators, means controlled by the operating keys for moving the second set of type carriers into connection with the actuators for the purpose of accumulating the total of the items listed by the first mentioned set of type carriers, and means for taking an impression upon a second record strip from the total type carriers and for feeding said record strip.

3. In a machine of the class described, the combination with a set of differentially movable actuators, operating keys therefor, a set of type carriers continuously connected to said actuators for listing items upon a record strip, a second set of type carriers normally disconnected from the actuators, means controlled by the operating keys for moving the second set of type carriers into connection with the actuators for the purpose of accumulating the total of the items listed by the first mentioned set of type carriers, a platen for taking an impression upon a second record strip from the total type carriers, an operating device for said platen, and means actuated by said operating device for alining the total type carriers and for feeding the total record strip as an incident to the recording of the total.

4. In a machine of the class described, the combination with independent sets of item and total type carriers, of a set of actuators common to said type carriers, operating keys and connections for driving the actuators for the purpose of listing items on a record strip and accumulating the total thereof by the item and total type carriers respectively, an operating device for listing the total from the total type carriers on a second record strip, and means controlled by the operating device in the listing of a total for alining the total type carriers and for feeding the total record strip.

5. In a machine of the class described, the combination with independent sets of item and total type carriers, of a set of actuators common to said type carriers, operating keys and connections for driving the actuators for the purpose of listing items on a record strip and accumulating the total thereof by the item and the total type carriers respectively, a platen for listing the total from the total type carriers on a second record strip, an oscillatory operating lever for actuating the platen, and means also actuated by the operating lever in the listing of a total for alining the total type carriers and for feeding the total record strip.

6. In an accounting machine, the combination with a plurality of type carriers for accumulating the total of items entered in the machine, of operating mechanism therefor, a platen for taking an impression upon a record strip from the type carriers, alining devices for the type carriers, and means independent of the operating mechanism for operating the platen and alining devices and feeding the record strip.

7. In an accounting machine, the combination with a plurality of type carriers for accumulating the total of items entered in the machine, of a movable frame supporting the type carriers, actuators for the type carriers normally out of operative relation therewith, an operating mechanism for moving the frame thereby carrying the type carriers into operative relation with the actuators and then moving the latter to actuate said type carriers, a platen for taking an impression from the type carriers upon a record strip, and means independent of the operating mechanism for operating the platen and feeding the record strip.

8. In a machine of the class described, the combination with total accumulating type carriers; of a set of actuators therefor normally out of operative relation therewith; keys for establishing operative relation between the set of actuators and the type carriers and then differentially adjusting the latter by the actuators; record strip supply and receiving rolls for carrying a record strip by the type carriers; and means independent of the keys for taking an impression upon the record strip from the type carriers and for moving the record strip rolls to feed the strip.

9. In an accounting machine, the combination with an operating mechanism; of a series of type carriers actuated thereby for entering items upon a record strip; a second series of type carriers also actuated by the operating mechanism for accumulating the total of the items entered upon the record strip; a platen for recording the total from the second series of type carriers upon the second record strip; means independent of the operating mechanism for operating the platen for recording the total and then feeding the record strip; and an additional impression mechanism for pressing suitable data upon the second record strip in juxtaposition to the recorded total.

10. In an accounting machine, the combination of operating mechanism; a series of type carriers operated thereby for accumulating the total of items entered in the machine; a platen for recording the total from the type carriers upon a record strip; means independent of the operating mechanism for operating the platen for recording the total and then afterward feeding the record strip; and manually operated mechanism for taking an additional impression upon the record strip in juxtaposition to the recorded total.

11. In an accounting machine, the combination of a set of total printing type carriers; manually operated means for taking an impression therefrom upon a record material and then feeding the record material; manually operated means for taking an additional impression upon the record material in juxtaposition to the recorded total; and a support for the record material in advance of the last mentioned means for supporting the material in position to be written upon by an operator, the first mentioned manually operated means being capable of operation to feed the record material to bring the portion printed upon by the second mentioned manually operated means over the support to enable the record material to be written upon in juxtaposition to the impression taken from the second mentioned impression means and without again recording the total from the total type carriers upon the record material.

12. In an accounting machine, the combination of a set of differentially movable actuators; a set of total accumulating type carriers normally in position to have a total printed therefrom; mechanism for moving the type carriers to operatively engage them with the actuators to be actuated by the latter, such movement carrying the type carriers out of such position that printing impressions can be taken therefrom.

13. In an accounting machine, the combination with a plurality of type carriers for accumulating the total of items entered in the machine, of a frame supporting the type carriers, actuators for the type carriers normally out of operative relation therewith, an operating mechanism for establishing operative relation between the actuators and the type carriers and then moving the former to actuate the type carriers, a platen for taking an impression from the type carriers upon a record strip, a reciprocating lever operable independent of the operating mechanism for operating the platen and feeding the record strip when given a full stroke and for feeding the record strip any desired distance without operating the platen when given partial reciprocating strokes.

In testimony whereof I affix my signature in the presence of two witnesses.

JOHN HENRY PATTERSON.

Witnesses:
  E. A. LEEDS,
  W. H. MUZZY.